Figure 1:
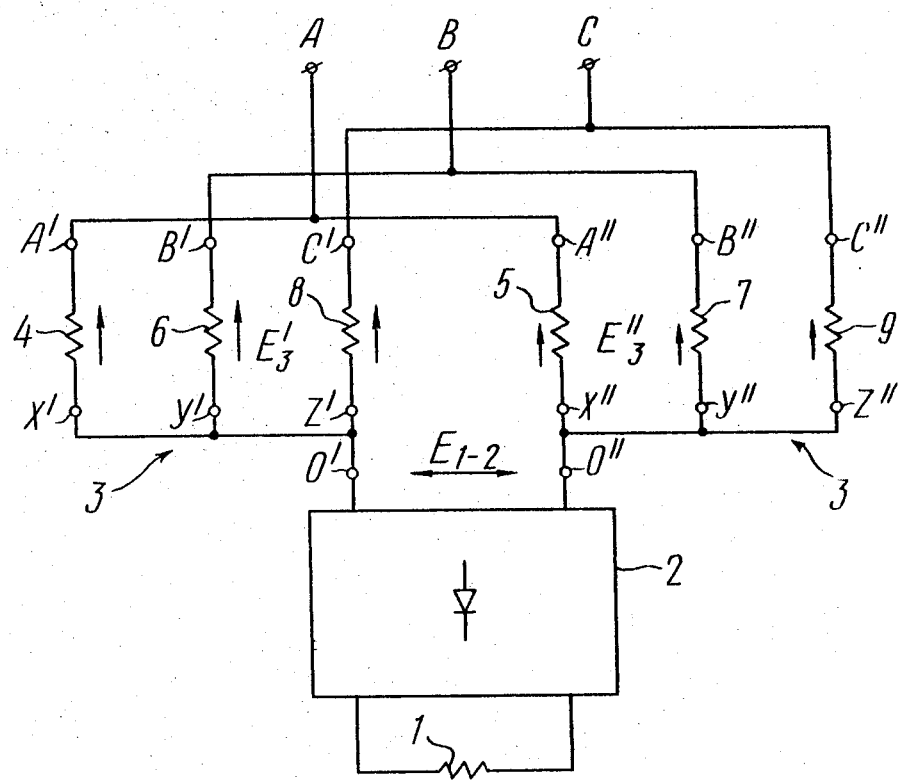

United States Patent [19]
Arutjunian et al.

[11] 3,868,564
[45] Feb. 25, 1975

[54] SYNCHRONOUS ELECTRIC MACHINE

[76] Inventors: Vladimir Semenovich Arutjunian,
UL. Marxa, 8 kv. 18;
Vigen Khachaturovich Mirimanian,
UL. Charentsa, 9, kv. 20,
both of Erevan, U.S.S.R.

[22] Filed: Jan. 10, 1974

[21] Appl. No.: 432,337

Related U.S. Application Data

[63] Continuation-in-part of Ser. No. 260,737, June 8, 1972.

[52] U.S. Cl. ............... 322/59, 310/198, 322/79, 322/87, 322/90
[51] Int. Cl. ............................................. H02p 9/14
[58] Field of Search ............. 322/59, 79, 87, 90; 310/197, 200, 198

[56] References Cited
UNITED STATES PATENTS
| | | | |
|---|---|---|---|
| 3,025,450 | 3/1962 | Krabbe | 322/79 X |
| 3,714,542 | 1/1973 | Arutjunian et al. | 322/59 |

*Primary Examiner*—William H. Beha, Jr.
*Assistant Examiner*—Robert J. Hickey
*Attorney, Agent, or Firm*—Eric H. Waters

[57] ABSTRACT

This invention is concerned with synchronous electric machines.

The synchronous electric machine of the present invention comprises an excitation winding, a rectifier energizing said excitation winding, and a three-phase armature winding with at least two circuits in each phase being wound with different pitches. Therewith, the like terminals of each phase's circuits are interconnected to form the terminal of a respective phase of the machine, the free terminals of the circuits of all the phases with one winding pitch being interconnected to form a neutral point and the free terminals of the circuits of all the phases with the other winding pitch being interconnected to form another neutral point with said rectifier being connected to said neutral points.

2 Claims, 2 Drawing Figures

SYNCHRONOUS ELECTRIC MACHINE

The present application is a continuation-in-part of our co-pending Application Ser. No. 260,737 filed June 8, 1972.

The present invention relates to synchronous electric machines, and more particularly to synchronous electric machines with excitation created by the third harmonic of the machine air-gap field.

A self-excited synchronous generator is known wherein excitation is created by the third harmonic of the machine air-gap field.

In this generator, to separate the third harmonic, placed in the armature slots in addition to the main armature winding is a special supplementary winding with a tripled number of poles, which winding energizes the excitation winding through a rectifier.

As a result of introducing said special supplementary winding, the machine becomes costlier, more cumbersome, less reliable, requires more cooper and insulating material, is more difficult to manufacture, and removing heat from the armature copper is rendered more difficult.

Also known is a synchronous electric machine excited by the third harmonic of its air-gap field without any additional winding. In this case, the third harmonic is separated as a triple-frequency voltage by the following two methods.

In case the synchronous machine is loaded via a transformer, the winding phases on the output side of the transformer are star-connected. The armature winding phases and the winding phases on the input side of the transformer are vee-connected with similar phase sequences and with the respective phases of these windings being interconnected. Then, the field third harmonic is separated across the terminals of the vees.

In case the synchronous machine is loaded directly, the armature winding is star-connected to a neutral point. To form an artificial second neutral point, connected to the terminals of the armature winding is a three-phase choke whose windings are zig-zag connected. In this case, the field third harmonic is separated at the neutral points of the stator winding and the choke.

In both cases, the field third harmonic separated as a triple-frequency voltage energizes the excitation winding of the machine via a capacitor and a rectifier.

Such an excitation of a synchronous machine is disadvantageous in that it necessitates the use of capacitors possessing very high capacity required to compensate for the high inductance of circuits traversed by a triple-frequency current, as well as a transformer or a choke, which involves higher expenditure of active and insulating materials, complicates the manufacture of the machine rendering it more cumbersome, heavier, more expensive and less reliable.

Still another three-phase synchronous electric machine is known in which the excitation winding is energized by an eight-arm rectifier bridge connected to all of the three phase terminals and the neutral point of the armature winding of the machine. In this case, the excitation winding is energized via a rectifier both by the armature winding main frequency voltage, which voltage is due to the fundamental field harmonic, and the armature winding phase triple-frequency voltage, which voltage is due to the third harmonic.

A disadvantage inherent in this machine resides in the necessity to provide a high-voltage excitation winding, which either involves structural modifications, hence raises the cost of the machine, or, in most cases, is absolutely out of question because of the impossibility of providing adequate cooling conditions for such a multiturn excitation winding in, for example, medium- or high-power machines. Moreover, such an arrangement of the machine with a conventional optimum pole geometry fails to provide for adequate excitation control due to the phase voltage third harmonic being too low as compared to the line voltage of the machine.

It is therefore an object of the present invention to eliminate the above disadvantages inherent in the prior art synchronous electric machines excited by the field third harmonic by providing a synchronous electric machine in which the field third harmonic is separated to create excitation in the armature winding without any additional windings or other circuit elements, which is attainable through modifying the armature winding and the circuitry of the machine in general.

This object is achieved by that in a synchronous electric machine cmprising an excitation winding, a rectifier energizing said excitation winding and a three-phase armature winding with at least two circuits in each phase, said two circuits of each phase of said three-phase armature winding are, according to the invention, wound with different pitches, the like terminals of each phase's circuits are interconnected to form the terminal of a respective phase of the machine, the free terminals of the circuits of all the phases with one winding pitch are interconnected to form a neutral point, the free terminals of the circuits of all the phases with the other winding pitch are interconnected to form another neutral point, and said rectifier is connected to said neutral points.

It is expedient that the ratio between the numbers of turns in the circuits of the three-phase armature winding with different winding pitches be selected so as to ensure the equality of the first harmonic emf values of these circuits.

Figure 2:
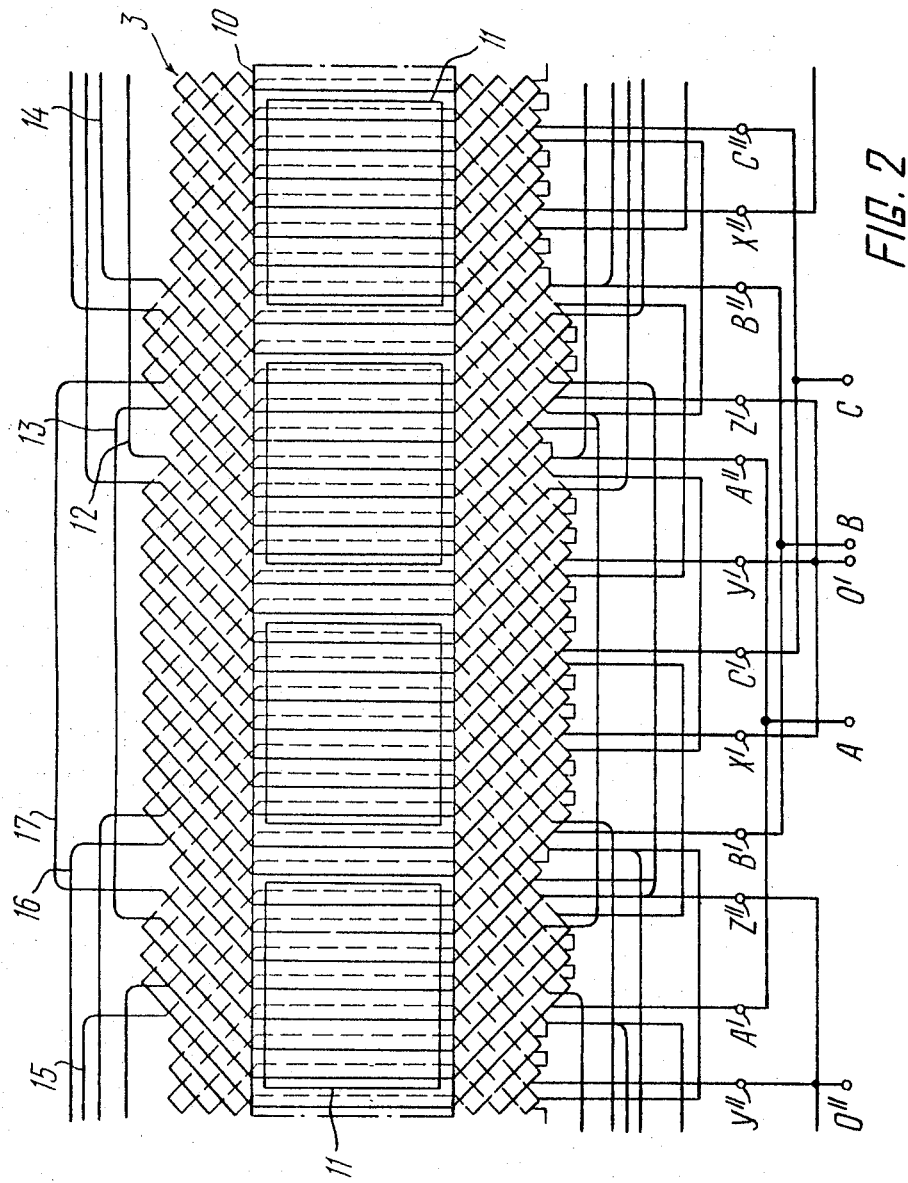

The invention will now be described in greater detail with reference to the accompanying drawings, wherein:

FIG. 1 is a circuit diagram of a synchronous electric machine, according to the invention; and FIG. 2 is a simlified representation of an embodiment of the machine of FIG. 1.

Referring to FIG. 1, the synchronous electric machine comprises an excitation winding 1, a rectifier 2 energizing this winding, and a three-phase armature winding 3 with two circuits in each phase: circuits 4 and 5 in phase A, circuits 6 and 7 in phase B, and circuits 8 and 9 in phase C. The circuits of each phase are wound with different pitches, the circuits 4, 6 and 8 having one winding pitch and the circuits 5, 7, 9, another. The like terminals A' and A'' of the circuits 4 and 5, B' and B'' of the circuits 6 and 7, and C' and C'' of the circuits 8 and 9 are interconnected to form terminals A, B and C of the respective phases. Free terminals X', Y' and Z' of the circuits 4, 6 and 8 with one winding pitch are interconnected to form a neutral point O', while free terminals X'', Y'' and Z'' of the circuits 5, 7 and 9 with the other winding pitch are interconnected to form another neutral point O'', the rectifier 2 being connected to both neutral points.

Due to the fact that the circuits of the phases of the armature winding 3 are wound with different pitches, the values of the third emf harmonics $E_3'$ of the circuits 4, 6, 8 and $E_3''$ of the circuits 5, 7, 9 are different as can be seen from FIG. 1. At the same time, the values of the third *emf* harmonics of the circuits with respect to the neutral points O' and O'' coincide in phase as in the case of phases of a symmetrical three-phase winding. Therefore, the third emf harmonic is absent across the terminals A, B and C of the machine. Being a sum of $E_3'$ and $E_3''$ in parallel circuits X'-A'-A''-X'', Y'-B'-B''-Y'' and Z'-C'-C''-Z'', the third *emf* harmonic manifests itself at the neutral points O' and O'' as a single-phase triple-frequency voltage $E_{1-2} = E_3' - E_3''$ due to the third harmonic of the machine air-gap field.

Thus, the excitation winding 1 is energized from the neutral points O' and O'' through the rectifier 2 with the field third harmonic separated in the armature winding of the machine.

Due to the generally known load dependence of the field third harmonic, such a machine ensures adequate excitation self-regulation.

However, due to the circuits of the armature winding phases being wound with different pitches, the values of the first harmonic emf of these circuits are not equal. This results equalizing currents through the armature winding causing additional losses.

To preclude this undesirable phenomenon, the number of turns in said phase circuits is made different, too. Therewith, the ratio between the numbers of turns in the circuits of the armature winding phases with different winding pitches is selected so as to ensure the equality of the first emf harmonic of these circuits.

Thus, with respect to the phase terminals A, B and C, the armature winding of the synchronous machine represented in FIG. 1 is a conventional armature winding with two parallel circuits, while, with respect to the neutral points O' and O'', it serves as a source of single-phase triple-frequency voltage.

Consider now a specific embodiment of the herein disclosed synchronous machine with reference to FIG. 2, which shows a four-pole machine with 36 armature slots comprising an armature 10 (for simplicity, the machine is shown in FIG. 2 in detail and an inductor 11 with poles. The slots of the armature 10 receive the three-phase two-layer armature winding 3 composed of 36 coils, 12 coils in each phase.

The inductor accomodates, as usual, the excitation winding coils (not shown). The machine may be made standard, when the armature with the armature winding are stationary and the inductor with the excitation winding are rotary, and reversed, when the inductor with the excitation winding are stationary and the armature with the armature winding are rotary.

The circuits A', X' of the phase A; B', Y' of the phase B, and C', Z' of the phase C are wound with a slot pitch $y' = 8$, i.e., a relative pitch $\beta' = 8/9$, and fill in the usual fashion the armature phase zones within the limits of two pole pitches.

The circuits A'', X'' of the phase A; B'', Y'' of the phase B, and C'', Z'' of the phase C are wound with a slot pitch $y'' = 6$, i.e., a relative pitch $\beta'' = 2/3$, and fill the remaining armature slots. However, when winding the circuits A'', X''; B'', Y'' and C'', Z'', six coils 12, 13, 14, 15, 16 and 17 out of 18 coils of these circuits have to be wound with a relative pitch $2 + \beta'' = 2 \ 2/3$ due to the difference between the pitches $\beta'$ and $\beta''$ and because of the necessity to obtain a symmetrical armature winding with all the slots being evenly filled. From the viewpoint of inducing the *emf*, the pitch $2 + \beta''$ is equal to the pitch $\beta''$, owing to which the circuits A'', X''; B'', Y'' and C'', Z'' are considered to be completely wound if their relative pitch is $\beta'' = 2/3$.

Since with $\beta' = 8/9$ the third emf harmonic $E_3' \neq 0$ is induced in the circuits A', X'; B', Y' and C', Z', and with the pitch $\beta'' = 2/3$ being shortened by one third $E_3'' = 0$ in the circuits A'', X''; B'', Y'' and C'', Z'', a triple-frequency emf $E_{1-2} = E_3'$ occurs at the points O' and O''.

It should be noted here that shown in FIG. 2 is only one of the possible embodiments of the armature winding 3.

The armature winding phases in the embodiment disclosed herein consist each of two circuits, however they can include more circuits also wound with two diffrent pitches It is obvious that any average specialist in the art can use the herein disclosed embodiment to realize the present invention with characteristics other than described herein above.

Experimental trial of the above-described machine has attested to its high performance.

Comparative analysis of machines having a power output of up to 100 kW indicates that substituting a conventional machine excited by the field third harmonic with the aid of a supplementary winding by a machine embodying the present invention with the same weight, active materials, overall dimensions, thermal loads and efficiency, permits of saving an average of 12 percent of armature insulation and increasing the power output by 15 percent.

What is claimed is:

1. A synchronous electric machine comprising an excitation winding, a rectifier energizing said excitation winding, and a three-phase armature winding; said three-phase armature winding having at least two circuits in each phase; said two circuits of each phase being wound with different pitches; the like terminals of said circuits of each phase being interconnected to form a terminal of a respective phase of said machine; the free terminals of the circuits of all the phases with one winding pitch being interconnected to form a neutral point; the free ends of the circuits of all the phases with the other winding pitch being interconnected to form another neutral point; said rectifier being connected to said neutral points.

2. A synchronous electric machine as claimed in claim 1, wherein the ratio between the numbers of turns in said circuits with different three-phase armature winding pitches is selected so as to ensure the equality of the first emf harmonic of said circuits.

* * * * *